D. A. T. Gale,

Motor.

No. 96,419. Patented Nov. 2, 1869.

Witnesses:
A. W. Almquist
Wm. F. Clark

Inventor:
D. A. T. Gale
per [Attorneys signature]
Attorneys.

United States Patent Office.

D'ALEMBERT T. GALE, OF POUGHKEEPSIE, NEW YORK.

Letters Patent No. 96,419, dated November 2, 1869.

IMPROVEMENT IN MECHANICAL-MOVEMENT.

The Schedule referred to in these Letters Patent and making part of the same.

*To all whom it may concern:*

Be it known that I, D'ALEMBERT T. GALE, of Poughkeepsie, in the county of Dutchess, and State of New York, have invented a new and useful Improvement in Mechanical Movement; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved mechanical movement for operating a churn or driving light machinery, which shall be simple in construction, effective in operation, and convenient in use; and It consists in the construction and combination of various parts of the machine, as hereinafter more fully described.

A represents the frame of the machine, which may be made of wood or iron, as may be desired or convenient.

B is the driving-shaft, which is pivoted to the frame A, and which may receive motion from a weight or spring, as may be desired or convenient.

To the shaft B is attached a large gear-wheel, C, which meshes into the small gear-wheel D, placed upon the shaft E, with which shaft it is connected by a clutch, F, so that it may be turned in one direction to wind up the weight or spring without carrying all the machinery with it, and so that when turned in the other direction, it may carry the said shaft E with it, and thus give motion to the machine.

The clutch F is held up against the wheel D, and at the same time allowed to give, when the wheel D is turned back to wind up the weight or spring, by means of the coiled spring G, placed upon the said shaft E.

Upon the shaft E is placed a gear-wheel, H, the teeth of which mesh into the teeth of the equal sized gear-wheel I, attached to the short shaft J, so that the said shaft J may receive motion from the shaft E, and will revolve in the opposite direction from said shaft E.

Figure 1:
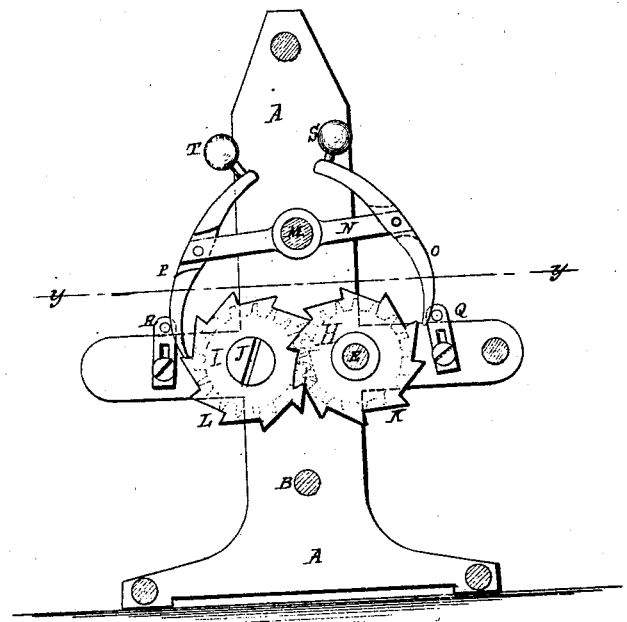
Figure 1 is a vertical section of my improved machine, taken through the line $x\ x$, fig. 2.
Figure 2:
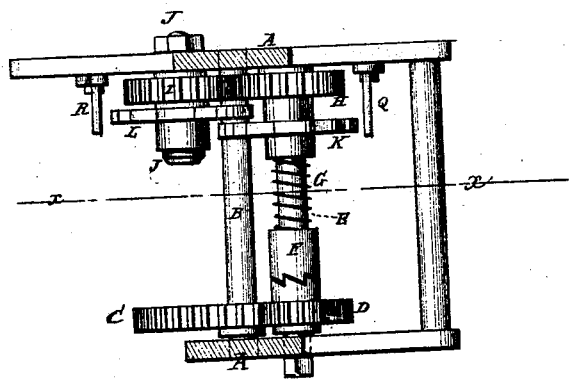
Figure 2 is a horizontal section of the same, taken through the line $y\ y$, fig. 1.

K and L are two ratchet-wheels, equal in size and in number of teeth, attached to the shafts E and J, and so arranged that their teeth may point in opposite directions, as shown in fig. 1.

M is a shaft, working in bearings in the frame A, and to which is attached a cross-bar, N, to the ends of which are pivoted the lever-pawls O P, the lower or engaging ends of which extend down into such a position as to come in contact with the teeth of the ratchet-wheels K L, alternately, and thus receive an impulse which is communicated to the shaft M.

The outer sides of the lower ends of the lever-pawls O P are inclined, so that as they move down, alternately, by coming in contact with the guide-pins Q R, adjustably attached to the frame A, they may be guided inward to come in contact with the teeth of the ratchet-wheels K L.

As each pawl is raised, alternately, by the impulse of the ratchet-wheels K L, their lower ends are moved outward, away from the teeth of the said ratchet-wheels K L, by the weights S T, connected with their upper ends.

The weights S T are detachable, so that they may be adjusted as required, either by replacing them with others heavier or lighter, or by shifting their position upon the upper ends of the said pawls O P.

From the shaft M, the motion may be communicated to the working-shaft, by a crank and connecting-rod connection, and from the working-shaft to the churn, or other machine to be driven by a crank, flywheel, connecting-rod, and walking-beam connection, about the arrangement of which parts there is nothing new.

By this construction and arrangement of the pawls, they not only receive the power with great force, but also allow the cross-bar N to be made longer, so as to gain an increased leverage.

Having thus described my invention,

I claim as new, and desire to secure by Letters Patent—

1. The two ratchet-wheels K L, two pawls O P, and cross-bar N, arranged and operating in connection with the shafts E J M, substantially as herein shown and described, and for the purpose set forth.

2. The combination of adjustable weights S T, with the pawls O P, that play upon the ratchet-wheels K L, substantially as herein shown and described, and for the purpose set forth.

The above specification of my invention signed by me, this 7th day of September, 1869.

D'ALEMBERT T. GALE.

Witnesses:
GEO. W. MABEE,
JAMES T. GRAHAM.